Patented Dec. 26, 1933

1,941,142

UNITED STATES PATENT OFFICE 1,941,142

PROCESS OF MAKING DINITRO-PHENYL-BENZOTHIAZYL-SULPHIDES

William P. ter Horst, Nitro, W. Va., assignor to The Rubber Service Laboratories Co., Akron, Ohio, a corporation of Ohio No Drawing. Application November 19, 1928
Serial No. 320,533

3 Claims. (Cl. 260—44)

The present invention relates to a process for the manufacture of the reaction product of a mercapto-aryl-thiazole or its alkali metal salts and nitrochlorbenzene compounds.

One of the preferred type of compounds, for example the reaction product of the potassium salt of mercapto-benzo-thiazole and 2,4 dinitrochlorbenzene, was prepared according to the following manner:

Approximately 20 parts by weight of mercapto-benzo-thiazole were dissolved in an equivalent amount of an approximate 20% aqueous solution of potassium hydroxide. To the solution of the potassium salt of mercapto-benzo-thiazole thus formed, an approximately equivalent portion of dinitrochlorbenzene (24.2 parts by weight) was added slowly thereto. Sufficient alcohol was then added to the reaction product to precipitate the potassium chloride formed by the reaction. The potassium chloride was filtered off and the reaction product of dinitrochlorbenzene and the potassium salt of mercapto-benzo-thiazole isolated by evaporation of the filtrate. The above reaction most probably takes place according to the following equation:

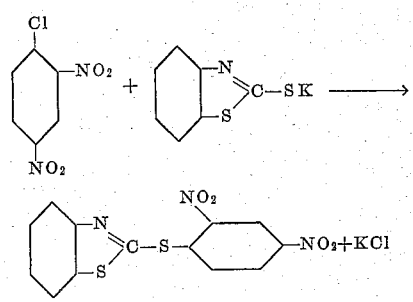

It will be observed that the new compounds as exemplified by the above product contain the group

and they may be expressed also as containing the group

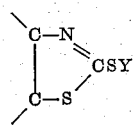

where Y in both groupings represents a nitro substituted phenyl group.

Other analogous methods of preparing the above compound are apparent to those skilled in the art to which the invention pertains. Thus, approximately molar portions of mercapto-benzo-thiazole (167 parts by weight) and sodium carbonate (106 parts by weight) were mixed and sufficient solvent, for example 133 parts of ethyl alcohol added so as to form a thin paste. This mixture was agitated by any convenient method, for example by stirring, for about one hour and then approximately one molar portion of dinitrochlorbenzene (202 parts by weight) dissolved in about 200 parts of a solvent, for example ethyl alcohol, was added slowly thereto at a temperature of substantially 50 to 70° C. A small quantity of said solvent was added from time to time to keep the mixture in the form of a smooth paste. Agitation of the mixture was continued at a temperature of about 50 to 70° C. for about five hours after the addition of the dinitrochlorbenzene was completed. The reaction product was then diluted with water in order to dissolve the sodium chloride formed by the reaction as well as the unreacted sodium carbonate. The water insoluble precipitate remaining, constituting the desired reaction product was filtered off, washed with water to remove any occluded sodium chloride or sodium carbonate solution present, and the material dried. The reaction product thus obtained was a yellow powder, which melted at substantially 157 to 159° C.

Another of the preferred type of compounds, for example the reaction product of the potassium salt of mercapto-benzo-thiazole and mono-p-nitrochlorbenzene was prepared in the following manner:

Approximately one molar portion (167 parts) of mercapto-benzo-thiazole was dissolved in an equivalent amount of a 20% aqueous solution of potassium hydroxide. To the aqueous solution of the potassium salt of mercapto-benzo-thiazole thus formed, approximately one molar portion (157.5 parts) of mono-p-nitrochlorbenzene, dissolved in an organic solvent, for example ethyl alcohol, was added slowly thereto at room temperature. After the addition of the mono-p-nitrochlorbenzene was completed, agitation was continued for about one hour at room temperature. Sufficient alcohol was then added to precipitate the potassium chloride formed which was filtered off. The reaction product was isolated by evaporating the filtrate to dryness. The material thus obtained was a yellow crystalline solid, melting substantially at 79–81° C., and is most probably formed according to the following equation:

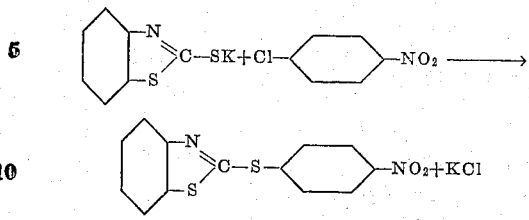

In an analogous manner to that hereinbefore described, other mercapto-aryl-thiazoles, for example mercapto-tolyl-thiazole and mercapto-xylyl-thiazole react with nitrochlorbenzene to form the preferred type of compounds.

Having thus described these examples of the invention, I do not wish to be understood as being limited to the exact proportions, ingredients, temperatures and steps set forth, for various changes may be made without departing from the essential features of my invention. The invention is limited solely by the claims attached hereto as a part of this specification wherein it is intended to claim the invention as broadly as possible in view of the prior art.

What is claimed is:

1. A method of making dinitro phenyl benzothiazyl sulphide which comprises mixing substantially equi-molecular quantities of mercaptobenzothiazole and sodium carbonate in alcohol in the substantial absence of water, adding thereto substantially an equi-molecular proportion of dinitro chlor benzene dissolved in alcohol at substantially 50–70° C., heating to substantially 50–70° C. to complete the reaction, adding water thereto and separating out the dinitro phenyl benzothiazyl sulphide.

2. A method of making 2,4 dinitro phenyl benzothiazyl sulphide which comprises forming a paste of substantially equimolecular quantities of mercaptobenzothiazole and sodium carbonate in alcohol in the substantial absence of water, adding thereto substantially in equi-molecular proportion of 2,4 dinitro chlor benzene dissolved in alcohol at substantially 50 to 70° C., heating to substantially 50–70° C. to complete the reaction, adding water thereto and separating out the 2,4 dinitro phenyl benzothiazyl sulphide.

3. A method of making dinitro phenyl benzothiazyl sulphides which comprises mixing substantially equi-molecular quantities of a mercaptobenzothiazole and an alkali metal carbonate in alcohol in the substantial absence of water, adding thereto substantially an equi-molecular proportion of dinitro chlor benzene dissolved in alcohol, heating until the reaction is complete, adding water thereto and separating out the dinitro phenyl benzothiazyl sulphide.

WILLIAM P. ter HORST.